(12) United States Patent
Albrecht et al.

(10) Patent No.: US 10,091,162 B2
(45) Date of Patent: Oct. 2, 2018

(54) ALLOCATION OF NETWORK ADDRESSES FOR NETWORK SUBSCRIBERS

(71) Applicant: Siemens Aktiengesellschaft, Munich (DE)

(72) Inventors: Harald Albrecht, Nürnberg (DE); Hendrik Gerlach, Erlangen (DE); Bernd Schönmüller, Fürth (DE); Thomas Talanis, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 114 days.

(21) Appl. No.: 14/734,113

(22) Filed: Jun. 9, 2015

(65) Prior Publication Data
US 2015/0358278 A1    Dec. 10, 2015

(30) Foreign Application Priority Data

Jun. 10, 2014    (EP) .................................. 14171757

(51) Int. Cl.
*G06F 13/00*    (2006.01)
*H04L 29/12*    (2006.01)

(52) U.S. Cl.
CPC ...... *H04L 61/2092* (2013.01); *H04L 61/6059* (2013.01); *H04L 61/6068* (2013.01)

(58) Field of Classification Search
CPC ............ H04L 61/2092; H04L 61/6059; H04L 61/6068
USPC ................. 709/245, 226, 220–222
See application file for complete search history.

(56) References Cited

U.S. PATENT DOCUMENTS

| 6,201,088 | B1 | 3/2001 | Gruber et al. |
| 6,430,527 | B1 | 8/2002 | Waters et al. |
| 6,697,354 | B1 * | 2/2004 | Borella ............ H04L 29/12009 370/352 |
| 6,697,360 | B1 * | 2/2004 | Gai ..................... H04L 41/0886 370/389 |
| 7,454,519 | B2 * | 11/2008 | Smith ............... H04L 29/12009 370/229 |
| 7,640,287 | B1 * | 12/2009 | Gai ..................... H04L 41/0886 370/389 |

(Continued)

FOREIGN PATENT DOCUMENTS

| CN | 101743722 | 6/2010 |
| CN | 101753635 | 6/2010 |

(Continued)

OTHER PUBLICATIONS

White A., Williams A. (Motorola); "Zero-Configuration Subnet Prefix Allocation Using UIAP draft-white-zeroconf-subnet-alloc-01.txt"; Nr. 1; pp. 1-17; ISSN: 0000-0004; XP015005728;; 2002; Oct. 31, 2002.

(Continued)

*Primary Examiner* — Kenneth R Coulter
(74) *Attorney, Agent, or Firm* — Cozen O'Connor

(57) ABSTRACT

A method for allocating network addresses for network subscribers in a segmented network having a plurality of subnetworks that are each connected via a subnetwork router to a busbar system that connects them. In one aspect, the subnetwork routers determine a shared address range locally by exchanging router messages that are distributed via the busbar system. Network addresses for the network subscribers are determined within the address range.

14 Claims, 2 Drawing Sheets

(56) References Cited

U.S. PATENT DOCUMENTS

| | | | |
|---|---|---|---|
| 7,711,852 B1 * | 5/2010 | Troan | H04L 41/0843 709/223 |
| 2002/0024965 A1 | 2/2002 | Lee | |
| 2003/0182445 A1 | 9/2003 | Cox | |
| 2008/0288617 A1 * | 11/2008 | Gillet | H04L 29/12254 709/222 |
| 2010/0254396 A1 | 10/2010 | Oman | |

FOREIGN PATENT DOCUMENTS

| | | |
|---|---|---|
| CN | 102474532 | 5/2012 |
| WO | WO 2010/069181 | 6/2010 |

OTHER PUBLICATIONS

Thaler Dave, Huitem Christian(Microsoft); "Multi-link Subnet Support in IPv6 <drat-ietf-ipv6-multilink-subnets-00.txt>"; Bd. ipv6; pp. 1-18; ISSN: 0000-0004; XP015002367;; 2002; Jun. 29, 2002.
Office Action dated Jan. 4, 2018 which issued in the corresponding Chinese Patent Application No. 201510316558.5.

* cited by examiner

ALLOCATION OF NETWORK ADDRESSES FOR NETWORK SUBSCRIBERS

BACKGROUND OF THE INVENTION

1. Field of the Invention

The application generally relates to a method for allocating network addresses for network subscribers in a segmented network having a plurality of subnetworks. In addition, the application relates to a router component for performing the method. In particular the application relates to the allocation of network addresses in segmented networks that have different subnetworks that are connected to a busbar system via routing.

2. Related Art

Networks having such a network topology are frequently used for machine installations in order to shield machine-internal subnetworks having sensors and actuators connected thereto from the busbar system to a large extent and thereby to allow machine operation that is both as safe as possible and interference-free. The busbar system is used to network the machines to one another and to other devices, such as an engineering system and/or user interfaces (HMI=Human Machine Interface) for the observation and operation of the machines. In segmented networks of this kind, there frequently is a requirement for direct access to automation-engineering devices in the separate subnetworks, for example, for diagnosis purposes.

Often, operational requirements mean that the entire network is embodied as a separate network. As a result, there is an absence of a default router on a topmost level. In alternative cases, in which there is a default router present, uninterrupted further operation of the network may be required even if the default router fails. In both cases, a stable internal address position is desired even without prior planning and/or manual configuration.

Since the overall network is not flat, but rather is separated into subnetworks, even a busbar system requires each network subscriber connected thereto to have knowledge about all the routes into the subnetworks. This affects programmable logic controllers for machines, an engineering system and/or user interfaces (and also other devices that are directly networked thereto).

It is also desirable for the network topology described to be able to be put into operation without difficulty, and also to be easily extended or changed later as well, for example when a further machine is installed, preferably without particular specialist IT (IT=Information Technology) and network knowledge. Finally, it is desirable to be able to use configuration-free network operation of this kind within parts of larger networks in the future, for example, within production cells as parts of larger production installations.

Known approaches to implementing network separation while being able to reach all network subscribers simultaneously, are via application routing and IP routing (IP=Internet Protocol).

In the case of application routing, the subnetworks, which may be embodied using different kinds of technologies, are used to build a shared (new) network layer with its own network addressing. In this case, such application networks are planned in advance using an engineering tool, for example, so that the available routes can be computed therefrom and loaded into the individual applications. In this case, the concept of application routing is static for some applications. In-situ adjustments for the installation of machines or the extension of existing machinery are not envisaged and always require the overall project, in which the changes need to be planned in advance and from which the amended route data then needs to be loaded into the network subscribers. However, the overall project is generally not available in situ because of practical considerations, and the personnel often does not have the engineering tool and the necessary specialist knowledge for operating it.

From IP routing, users expect more flexibility and continuous and open, standardized communication. However, the architecture of the IP is largely governed by the needs of general IT and by Internet Service Providers (ISP). However, these instances of use do not feature the above-described network topology of segmented separate networks in practice. Accordingly, there is a lack of automatism particularly in the still widely used IPv4 (=Internet Protocol version 4), in order to be able to put these special network topologies into operation, and later extend them, preferably without configuration and without specialist knowledge.

SUMMARY OF THE INVENTION

It is therefore an object of an embodiment of the present invention to provide an improved method for allocating network addresses for network subscribers in a segmented network having a plurality of subnetworks. In addition, it is an object of an embodiment of the present invention to provide a router component for performing the method.

The method according to an embodiment of the invention involves the allocation of network addresses for network subscribers in a segmented network having a plurality of subnetworks, wherein the subnetworks are each connected via a subnetwork router to a busbar system that connects them. In this embodiment, the subnetwork routers determine a shared address range locally by exchanging router messages that are distributed via the busbar system, and network addresses for the network subscribers are stipulated within the address range.

In one aspect, the invention therefore realizes local allocation of network addresses by subnetwork routers in a segmented network. This produces an address position without configuration, requiring neither a central router (root router or default router) nor manual configuration. This firstly saves costs for the central router and the planning and design of the network. Secondly, it avoids errors due to a manual configuration. In addition, it advantageously prevents failure of a central router from disturbing the entire network. Furthermore, users require no specialist knowledge about networks and address configuration, since the network configures itself. Since manual configuration of routes is dispensed with, there is also no need for privileged adjustments that users are not permitted to carry out for organizational reasons.

In one embodiment, the subnetwork routers determine a busbar system prefix for the network addresses, which denotes the busbar system, locally among one another by exchanging router messages.

In this embodiment, a prefix is generally understood to mean a network part of network addresses that is the same for all network addresses in a network (or subnetwork). The term was chosen based on IPv6 (Internet Protocol version 6), but is not intended to be understood as being limited to IPv6.

The local determination of a busbar system prefix for the busbar system advantageously allows configuration-free association of the subnetworks with the busbar system, again without requiring a central router or planning and design of the network. The busbar system may itself be a network portion from a larger network and as such be denoted by its busbar system prefix.

In order to determine the busbar system prefix, preferably a selection rule for selecting a busbar system prefix from a set of prefix candidates is prescribed. Each subnetwork router initially generates a prefix candidate independently of the other subnetwork routers. Subsequently, the subnetwork routers exchange router messages distributed via the busbar system in order to determine the busbar system prefix from the set of prefix candidates generated by the subnetwork routers based on the prescribed selection rule. In this case, the selection rule is taken as a basis for selecting the numerically smallest prefix candidate from a set of prefix candidates as the busbar system prefix, for example.

This embodiment advantageously allows easy-to-implement local determination of the busbar system prefix by the subnetwork routers.

Preferably, this involves each subnetwork router notifying the other subnetwork routers of the prefix candidate it generates by router messages until the subnetwork router is notified by another subnetwork router of a prefix candidate that is numerically smaller than the prefix candidate it generates. In addition, the subnetwork router replaces the prefix candidate it generates or a prefix candidate replacing the generated prefix candidate with a prefix candidate of which the subnetwork router is notified by another subnetwork router if the prefix candidate, of which the subnetwork router is notified, is numerically smaller than the prefix candidate generated by the subnetwork router or than the prefix candidate replacing the generated prefix candidate.

The effect of this embodiment is that only that subnetwork router that has generated the smallest prefix candidate among all the subnetwork routers provides notification of its prefix candidate via the busbar system, and all other subnetwork routers replace each prefix candidate that they originally generated with this smallest prefix candidate. As a result, the subnetwork routers agree on the smallest generated prefix candidate as a busbar system prefix. The suitably controlled sending of router messages that provide notification of prefix candidates, allows this agreement on one busbar system prefix to be reached very quickly by the subnetwork routers. Following the agreement, only one subnetwork router remains "active," in the sense that it continues to provide notification of the selected busbar system prefix via the busbar system.

In addition, preferably each subnetwork router that identifies logoff or failure of a subnetwork router that notifies the other subnetwork routers of the selected busbar system prefix by router messages notifies the other subnetwork routers of the selected busbar system prefix by router messages until it is notified of the selected busbar system prefix by another subnetwork router that has a smaller link-local network address than it.

The foregoing embodiment ensures that the role of "active" subnetwork router that provides notification of the selected busbar system prefix via the busbar system is taken on by another subnetwork router, in the event of the respective active subnetwork router failing or logging off, said other subnetwork router identifying the failure or logoff. If the failure or logoff of the active subnetwork router is identified by a plurality of subnetwork routers more or less simultaneously, the subnetwork router among the subnetwork routers that has the smallest link-local network address becomes the new active subnetwork router. In this way, the address position in the network remains advantageously stable so long as there still is at least one subnetwork router in operation. In one embodiment, only if all subnetwork routers are switched off or disconnected and restarted again does the busbar system prefix need to be re-determined. This applies as long as a persistent memory is not used on the subnetwork routers.

In another embodiment, each subnetwork router determines a subnetwork address range of its own, and a router message notifies the other subnetwork routers of a route into this subnetwork address range. Preferably, this involves each subnetwork router determining a subnetwork prefix from its subnetwork address range for each subnetwork that it connects to the busbar system.

This embodiment allows hosts that are connected to the busbar system to be able to communicate with subnetwork subscribers in subnetworks without configuration.

In another embodiment, an Internet protocol is used as a network protocol for data interchange in the network, and the network addresses are created on the basis of the Internet protocol used. Preferably, the Internet protocol used in this embodiment is IPv6 (Internet Protocol version 6).

An Internet protocol is advantageously suitable as a network protocol for data interchange in a segmented network, since it provides for the network addresses to be split into a network part (prefix) and a device part. IPv6 is particularly suitable, since it uses the router advertisements to provide a protocol that is already suitable for selecting address ranges, particularly prefixes.

Accordingly, when IPv6 is used, the router messages are preferably router advertisements based on IPv6.

A router component for performing the method according to an embodiment is designed to use received router messages to identify subnetwork routers connected to the busbar system and to contribute to the inventive determination of a busbar system prefix by evaluating received router messages and producing router messages.

In one embodiment, the subnetwork router therefore has a router component of such design. In one embodiment, such a subnetwork router is in the form of a programmable logic controller or by way of example is integrated into a programmable logic controller.

BRIEF DESCRIPTION OF THE DRAWINGS

The properties, features and advantages of the different embodiments that are described above and also the way in which they are achieved will become clearer and more distinctly comprehensible in connection with the description of exemplary embodiments that follow, the exemplary embodiments being explained in more detail in connection with the drawings, in which.

Parts that correspond to one another are provided with the same reference symbols of the figures.

DETAILED DESCRIPTION OF THE PRESENTLY PREFERRED EMBODIMENTS

Figure 1:
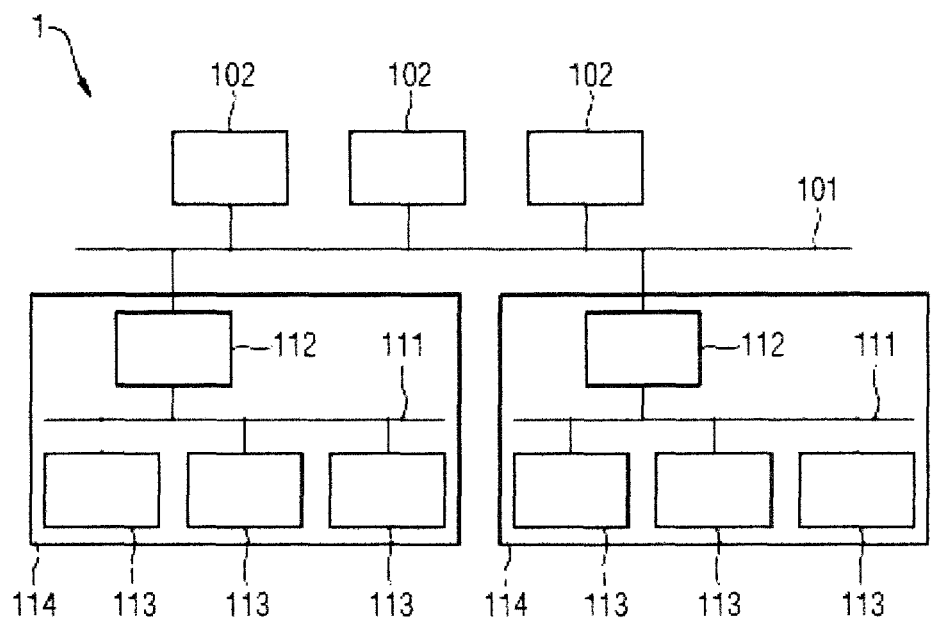
FIG. 1 shows a block diagram of a segmented network having a plurality of subnetworks.

FIG. 1 shows a block diagram of a segmented network 1 having a plurality of subnetworks 111 that are each connected via a subnetwork router 112 to a busbar system 101 that connects them.

In addition, the network 1 may comprise further hosts 102 without router functionality that are connected to the busbar system 101. Such further hosts 102 can include an engineering system or man/machine interfaces, for example.

Each subnetwork 111 comprises a plurality of subnetwork subscribers 113. By way of example, the subnetwork subscribers 113 in a subnetwork 111 are each input/output units of a machine 114. The subnetwork router 112 of a subnetwork 111 is used to transmit data from the busbar system 101 to the subnetwork 111 and from the subnetwork 111 to the busbar system 101. In one embodiment, a plurality of subnetworks 111 can have the same subnetwork router 112.

The text below describes an exemplary embodiment in which IPv6 (Internet Protocol version 6) is used as the network protocol for data transmission in the network 1.

Figure 2:
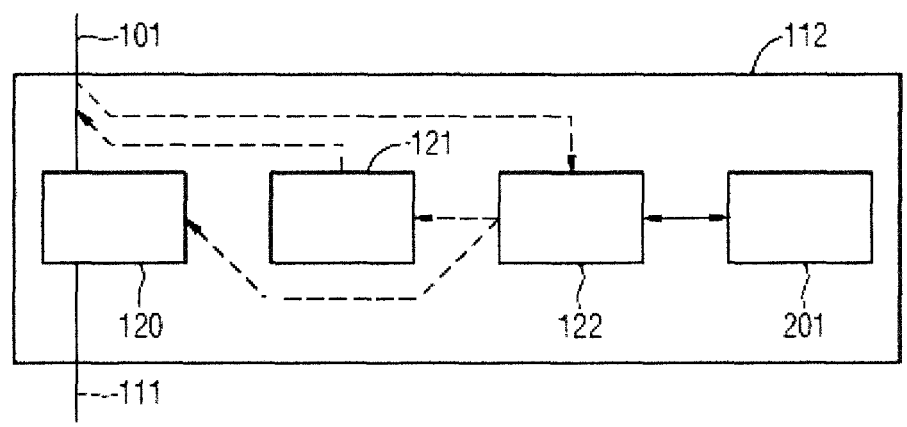
FIG. 2 shows a block diagram of a subnetwork router.

FIG. 2 shows a block diagram of a subnetwork router 112. The subnetwork router 112 is realized in the form of a programmable logic controller, for example. The subnetwork router 112 comprises an IP router 120 for IPv6, a router advertisement daemon 121 for sending router advertisements based on IPv6 and a router component 122 for determining a busbar system prefix 201 for IPv6, the determination is described in more detail below. The router advertisement daemon 121 and the router component 122 are realized in the form of software components of the subnetwork router 112.

The subnetwork routers 112 determine a shared address range for network addresses in the network 1 locally by exchanging router advertisements that are distributed via the busbar system. Network addresses for the network subscribers are stipulated within the address range.

To this end, the router components 122 are designed such that they
- identify the subnetwork routers 112 connected to the shared busbar system 101 on the basis of the router advertisements from said subnetwork routers with route information,
- stipulate a shared address band, preferably from the ULA range (ULA=Unique Local Addresses), locally on the basis of an algorithm as described below without the need for a central superordinate router (that is to say a default router), and then maintain said address band in a stable manner even beyond disconnection of individual or multiple subnetwork routers 112,
- determine suitable prefix and route information therefrom and also track said information in the event of changes, said information then being distributed to all IPv6 hosts on the busbar system 101, i.e. to the subnetwork routers 112 and the further hosts 102, by the standard mechanism of router advertisements from IPv6,
- whereupon these IPv6 hosts set up, track or erase the necessary routes to the available subnetworks 111 dynamically and independently on the basis of the IPv6 standards.

The discussion below describes how the address position is stipulated and announced in each of the subnetworks 111.

A user activates the operation of the router component 122 of the associated subnetwork router 112 during the planning phase or alternatively when a machine 114 is installed. If there are even lower subnetworks in existence on the respective subnetwork 111, the user activates the router component 122 only on the topmost level. In addition, a subnetwork router 112 has a stipulation concerning which of its IP interfaces operates as what is known as an upstream interface toward the busbar system 101; all other IP interfaces act as what are known as downstream interfaces toward a respective subnetwork 111 connected to the subnetwork router 112.

During operation, each subnetwork router 112 independently determines a ULA band of its own in accordance with the definition in the IPv6 standard of RFC 4193 (RFC=Request for Comments). The ULA band can be determined statically from the MAC address (=Media Access Control address) of the upstream interface, for example. This approach differs from the IPv6 standard of RFC 4193 in that a random band is intentionally not used, rather, the same ULA band is used, which is nevertheless sufficiently explicit, based on the MAC address. Consequently, the address position continues to have the longest-term stability possible.

From this own ULA band, the subnetwork router 112 takes suitable subnetwork prefixes for use on the subnetworks 111, thus on its downstream interfaces. In addition, the ULA band is used for possible further division if there are even lower subnetworks in existence on a subnetwork 111.

Each subnetwork router 112 additionally emits the route into its own ULA band on the busbar system 101 by router advertisement. This emission is effected in accordance with RFC 4861. As a result, IPv6 hosts connected to the busbar system are provided with the opportunity to be able to communicate with subnetwork subscribers 113 in the subnetworks 111.

The discussion below describes how a shared address position on the busbar system is stipulated and recorded.

When a subnetwork router 112 starts, it first generates a /64 prefix from its own ULA band as a prefix candidate for a busbar system prefix 201 for the busbar system 101.

In addition, each subnetwork router 112—provided that it has not yet heard another subnetwork router 112—begins (after a short wait time) to transmit router advertisements that announce its prefix candidate for the busbar system 101.

At the same time, each subnetwork router 112 evaluates the router advertisements from other subnetwork routers 112 to determine whether they contain prefix information about the busbar system 101. On the basis of a selection rule that is identical for all subnetwork routers 112, said subnetwork routers now each determine whether they take on another prefix candidate or insist on their own prefix candidate. To this end, they select the respective numerically smaller prefix candidate from their own prefix candidate and the determined prefix candidate.

If the prefix candidate generated at the beginning is replaced in this embodiment, the subnetwork router 112 in question withdraws its own prefix candidate that it has announced to date in a controlled manner by discontinuing it in RFC-compliant fashion by setting the life to zero. There is initially no notification provided by router advertisement via the busbar system 101 for the new prefix candidate taken on. Rather, the subnetwork router in question changes to a "silent" mode of operation in which, although providing notification of its subnetwork route, it does not provide notification of the new prefix candidate on the busbar system 101.

Therefore, after a short time, only a single "active" subnetwork router 112 remains that distributes the selected, now valid, busbar system prefix 201 on the busbar system 101.

When a silent subnetwork router 112 identifies that the active subnetwork router 112 has logged off or failed, it in turn changes to the active operating phase. In one embodiment, it is possible for a plurality of subnetwork routers 112 to become active almost simultaneously. This situation is identifiable for a subnetwork router 112 because it hears the same busbar system prefix 201 that it actually emits itself. In this embodiment, those active subnetwork routers 112 that hear a subnetwork router 112 that provides notification of the busbar system prefix 201 and has a smaller link-local IPv6 address than them, change to the silent mode of operation.

Consequently, only one busbar system prefix 201 is emitted and used on the busbar system 101. At the same time, this busbar system prefix 201 is permanent while there is at least one other subnetwork router 112 in operation.

In one embodiment, only when all subnetwork routers 112 are switched off and restarted does the entire process begin all over again.

An additional improvement to address stability can be achieved by the following extension of the approach outlined above. The life of the busbar system prefix 201 on the busbar system 101 is additionally evaluated, this life being jointly used for the decision by a subnetwork router 112 to withdraw itself from selection of the busbar system prefix 201. To this end, the prefix candidate initially generated for itself is assigned a very short life, for example, in the range of minutes. Silent subnetwork routers 112 additionally remember not only the valid busbar system prefix 201 but also the life thereof. Hence, they are capable of correctly obtaining the life of the busbar system prefix 201 should they need to become active. Once a subnetwork router 112 is active, it raises the life of the prefix candidate that it generates, or the busbar system prefix 201, if it hears another subnetwork router 112 that has a higher IPv6 address than it. As a result, a confirmed busbar system prefix 201 is still maintained as a result of its relatively long life even if device exchange means that a new subnetwork router 112 with a smaller IPv6 address than previously is added.

The router component 122 of a subnetwork router 112 controls the router advertisements to be emitted by the router advertisement daemon 121 of the subnetwork router 112 and configures the upstream interface of the subnetwork router 112 in accordance with the selected busbar system prefix 201.

Figure 3:
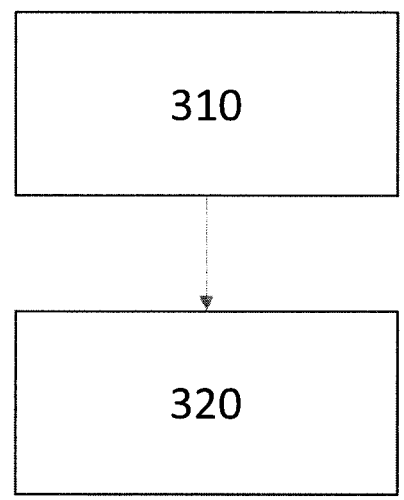
FIG. 3 is a flowchart of a method of an exemplary embodiment.

FIG. 3 is a flowchart of an exemplary method for allocating network addresses for network subscribers in a segmented network having a plurality of subnetworks that are each connected via a subnetwork router to a busbar system that connects them.

In step 310, a shared address range is locally determined by the subnetwork routers by exchanging router messages that are distributed via the busbar system.

In step 320, network addresses are allocated for the network subscribers within the address range.

Although different aspects of the invention have been illustrated and described in more detail by preferred exemplary embodiments, the invention is not restricted by the disclosed examples and other variations can be derived therefrom by a person skilled in the art without departing from the scope of protection of the invention.

Thus, while there have been shown, described, and pointed out fundamental novel features as applied to a preferred embodiment thereof, it will be understood that various omissions and substitutions and changes in the form and details of the devices illustrated, and in their operation, may be made by those skilled in the art without departing from the spirit of the claimed subject matter. For example, it is expressly intended that all combinations of those elements and/or method steps which perform substantially the same function in substantially the same way to achieve the same results are within the scope of the present disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

LIST OF REFERENCE SYMBOLS

1 Network
101 Busbar system
102 Host without router functionality
111 Subnetwork
112 Subnetwork router
113 Subnetwork subscriber
114 Machine
120 IP router
121 Router advertisement daemon
122 Router component
201 Busbar system prefix

What is claimed is:

1. A method for allocating network addresses for network subscribers in a segmented network having a plurality of subnetworks connected via a subnetwork router including a processor and memory to a busbar system which interconnects said plurality of subnetworks to provide interference free operation of the segmented network, the method comprising:
   exchanging router messages including route information between subnetwork routers including respective processors and memory via the busbar system;
   determining, decentrally by the subnetwork routers including the respective processors and memory, a shared address range based on the exchanged router messages including the route information distributed via the busbar system, each subnetwork router identifying other subnetwork routers connected to the busbar system based on the exchanged router messages; and
   allocating the network addresses for the network subscribers within the shared address range to provide the interference free operation of the segmented network.

2. The method of claim 1, further comprising determining, by the subnetwork routers including the processor and memory, a busbar system prefix for the network addresses, which denotes the busbar system, decentrally among one another by exchanging router messages including the route information.

3. The method of claim 2, further comprising:
   prescribing a selection rule for selecting the busbar system prefix from a set of prefix candidates,
   initially generating a prefix candidate independently of the other subnetwork routers including the processor and memory by each subnetwork router, and
   subsequently exchanging router messages including the route information distributed via the busbar system, by the subnetwork routers including the processor and memory, to determine the busbar system prefix from the set of prefix candidates generated by the subnetwork routers based on the prescribed selection rule.

4. The method of claim 2, further comprising selecting the numerically smallest prefix candidate, from a set of prefix candidates based on the selection rule, as the busbar system prefix.

5. The method of claim 4,
   wherein each subnetwork router including the processor and memory notifies the other subnetwork routers of the prefix candidate it generates, by router messages including the route information until the subnetwork router including the processor and memory is notified by another subnetwork router of a prefix candidate that is numerically smaller than the prefix candidate it generates, and wherein the subnetwork router including the processor and memory replaces the prefix candidate it generates or a prefix candidate replacing the generated prefix candidate with a prefix candidate of which the subnetwork router is notified by another subnetwork router, if the prefix candidate of which the subnetwork router is notified is numerically smaller than the prefix candidate generated by the subnetwork router or numerically smaller than the prefix candidate replacing the generated prefix candidate.

6. The method of claim 5, wherein each subnetwork router including the processor and memory that identifies logoff or failure of a subnetwork router that notifies the other subnetwork routers of the selected busbar system prefix by router messages including the route information, notifies the other subnetwork routers of the selected busbar system prefix by router messages including the route information until it is notified of the selected busbar system prefix by another subnetwork router that has a smaller link-local network address than itself.

7. The method of claim 1, wherein each subnetwork router including the processor and memory determines a subnetwork address range of its own, and wherein a router message including the route information notifies the other subnetwork routers of a route into this subnetwork address range.

8. The method of claim 7, wherein each subnetwork router including the processor and memory determines a subnetwork prefix from its subnetwork address range for each subnetwork that it connects to the busbar system.

9. The method of claim 1, wherein an Internet protocol is used as a network protocol for data interchange in the network, and wherein the network addresses are created based on the used Internet protocol.

10. The method of claim 9, wherein the Internet protocol used is Internet Protocol version 6.

11. The method of claim 10, wherein the router messages including the route information are router advertisements based on Internet Protocol version 6.

12. A router component for performing the method as claimed in claim 1, wherein the router component is configured to:

use received router messages including the route information to identify subnetwork routers connected to the busbar system, and determine the busbar system prefix by evaluating received router messages including the route information and produce router messages including the route information.

13. A subnetwork router including the processor and memory and having a router component as claimed in claim 12.

14. The subnetwork router of claim 13, wherein the subnetwork router comprises a programmable logic controller or is integrated into the programmable logic controller.

* * * * *